United States Patent [19]
Marantette

[11] Patent Number: 5,412,476
[45] Date of Patent: May 2, 1995

[54] DRILL BIT POSITION SENSOR

[75] Inventor: William F. Marantette, Torrance, Calif.

[73] Assignee: Optima Industries, Inc., Torrance, Calif.

[21] Appl. No.: 153,305

[22] Filed: Nov. 16, 1993

[51] Int. Cl.$^6$ .................... G01B 11/14; G01N 21/86
[52] U.S. Cl. ................................ 356/375; 356/387; 250/561
[58] Field of Search ............... 356/372, 375, 376, 426, 356/384–387, 429–431, 238; 408/137–138, 8, 9, 10, 12, 16, 17, 223, 230; 409/227; 250/560, 561; 73/655–657

[56] References Cited

U.S. PATENT DOCUMENTS

| | | | |
|---|---|---|---|
| 4,340,326 | 7/1982 | Buonauro et al. | 250/561 |
| 4,436,427 | 3/1984 | Schwartz | 356/385 |
| 4,502,823 | 3/1985 | Wronski et al. | 408/11 |
| 4,745,557 | 5/1988 | Pekar et al. | 318/561 |
| 5,004,930 | 4/1991 | Gremaud et al. | 250/561 |
| 5,005,978 | 4/1991 | Skunes et al. | 356/385 |
| 5,026,165 | 6/1991 | Faville | 356/386 |
| 5,212,391 | 5/1993 | Wachli | 356/375 |
| 5,293,048 | 3/1994 | Skunes et al. | 250/561 |

Primary Examiner—Hoa Q. Pham
Attorney, Agent, or Firm—Poms, Smith, Lande & Rose

[57] ABSTRACT

Longitudinal position of the end of a drill bit (21) is determined in order to accurately control depth of a hole to be drilled. A drill bit (21) is rotated at a predetermined speed and caused to penetrate a light beam of known vertical position. The light beam, which is generated by a light emitting diode (50) and received by a photo transistor (54), is modulated by the flutes at the tip of the rotating bit to cause the photo transistor to provide an output signal that is modulated at a frequency that is a fixed multiple of the speed of the rotating bit. An operational amplifier (74) having a feedback circuit (80) that is resonant at the frequency of the modulated electrical signal from the photo transistor receives the photo transistor output signal as its input. The amplifier output experiences a sharp increase in magnitude upon receipt of the input signal at the resonant frequency of its feedback circuit. Thus a reference position of the bit is signalled and stored by the bit spindle control (18) that will move the bit longitudinally to a depth determined on the basis of the known bit reference position.

9 Claims, 3 Drawing Sheets

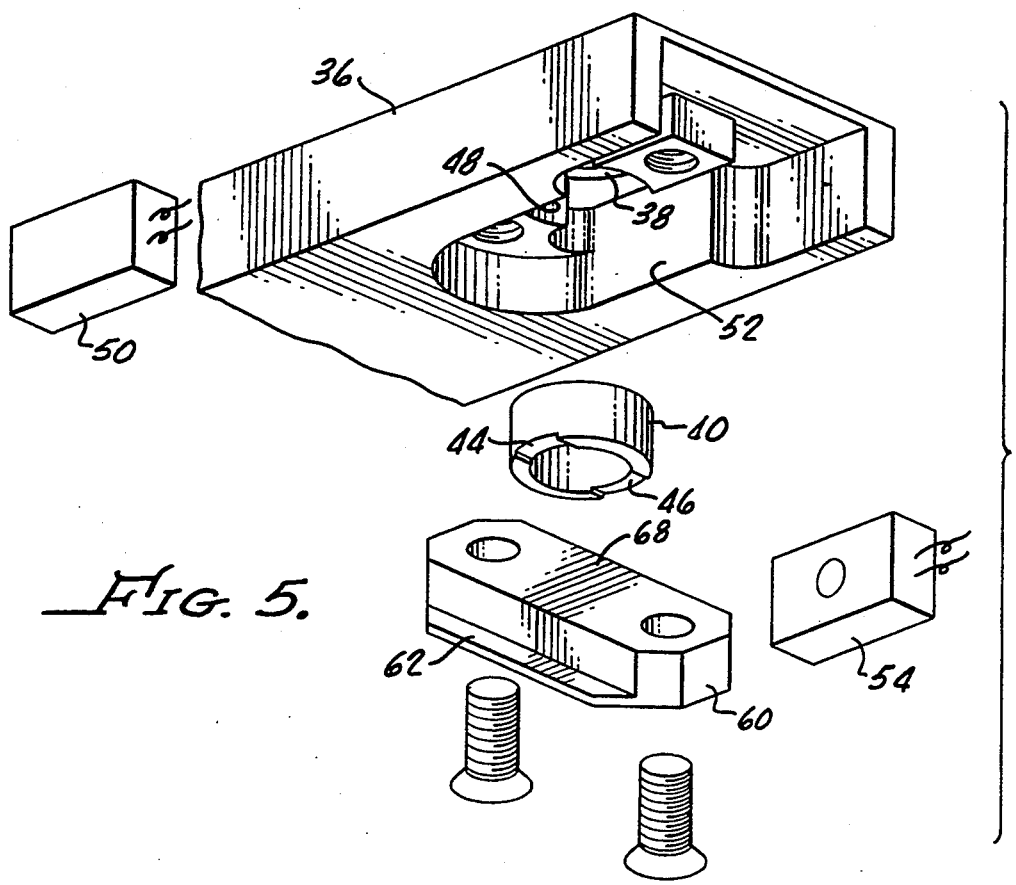
Fig. 5.
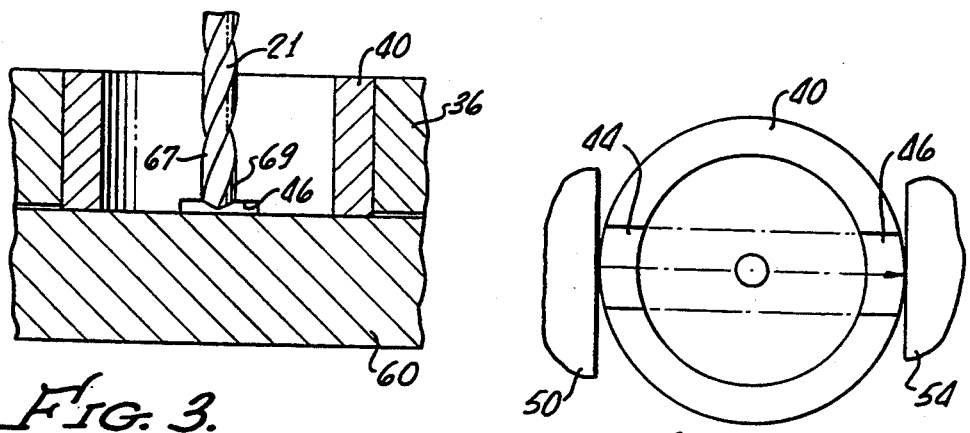
Fig. 3.
Fig. 4.

DRILL BIT POSITION SENSOR

BACKGROUND OF THE INVENTION

1. Field of the Invention

The present invention relates to drilled hole depth control, and more particularly concerns simple, inexpensive measurement of a reference position of the end of a rotating drill bit.

2. Description of Related Art

In a typical automatic drilling or routing machine a drill bit or drill point is inserted into a chuck of a spindle that securely grasps and rotates the bit. The chuck is moved relative to a workpiece in X and Y positions, horizontally, to locate the horizontal position of the bit for proper location of the hole to be drilled. The spindle with its bit is then moved vertically in a Z axis direction to cause the rotating bit to penetrate a workpiece to a predetermined depth so as to drill a hole to a predetermined depth. Depth of the hole is controlled by the machine tool controller, which calculates and commands all of the tool positioning, including the Z axis positioning for hole depth drilling. Although the machine tool control can precisely command the magnitude of Z axis motion, precision of hole depth control requires precision information concerning the Z axis position of the bit end. As each bit is inserted into a spindle it may occupy different longitudinal positions relative to the spindle, depending upon how far into the spindle the bit is inserted. Even if the position of the bit relative to the spindle be precisely known, it is still necessary to calibrate the system to precisely determine the height of the bit end at some given Z axis position of the machine tool itself.

In a typical drill bit locating system of the prior art a pressure plate system is employed in which the tip of the drill bit is caused to contact the pressure plate. When sufficient pressure is applied to the plate by the drill bit a signalling circuit is activated that enables the machine to know and store the Z axis position of the drill tip. Tips of drills, particularly with very small diameter drills, are subject to significant abuse in the practice of this method, because the pressure contact will dull the tip and shorten its life span. Moreover, accidentally applied excess pressure may break fragile small diameter drill bits.

Other systems have employed a very fine diameter laser beam that is directed at the tip of the drill bit to identify drill bit Z axis position with good inherent accuracy. However, such a laser system is excessively expensive.

Accordingly, it is an object of the present invention to provide a drill bit end position sensor that avoids or eliminates above mentioned problems.

SUMMARY OF THE INVENTION

In carrying out principles of the present invention in accordance with a preferred embodiment thereof a drill bit is rotated at a known speed and a light beam is projected along a path of known position. The beam is caused to be modulated at a predetermined frequency related to the bit rotation speed by moving the end of the drill bit into the path of the beam while the drill bit is rotating. The fluted end of the rotating drill bit modulates the beam, and occurrence of this modulation is detected to enable indication of the position of the drill bit at the time of modulation.

According to a specific feature of the invention, modulation of the light beam is caused to provide a modulated electrical signal having a frequency that is a fixed multiple of speed of the drill bit rotation. This modulated electrical signal is applied to a circuit that is resonant at the sensing frequency, thereby utilizing the high change in impedance of the resonant circuit at resonance.

BRIEF DESCRIPTION OF THE DRAWINGS

FIG. 3 is a fragmentary sectional view taken on lines 3—3 of FIG. 2, showing the drill bit flutes from a different angle;

FIG. 4 is a section take on lines 4—4 of FIG. 2;

FIG. 5 is an exploded pictorial illustration of parts of the sensor of FIG. 2.

DETAILED DESCRIPTION OF THE PREFERRED EMBODIMENTS

Figure 1:
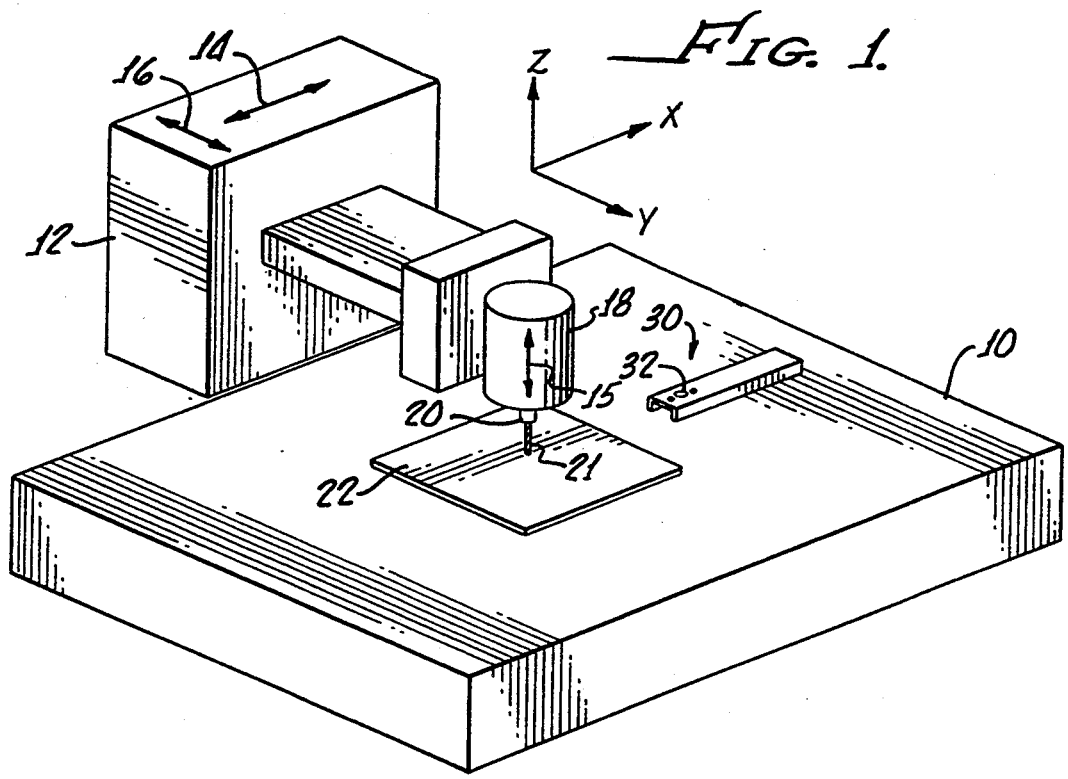
FIG. 1 is a highly schematic and simplified illustration of a machine tool drilling system that may employ principles of the present invention.

As illustrated in FIG. 1, a work table 10 movably mounts a drill spindle carrier 12 for motion in X and Y directions, as indicated by arrows 14,16, under control of drive motors (not shown). A drill spindle 18 carried by the support structure 12 includes a motor (not shown) for vertical or Z axis control of a chuck 20 as indicated by arrow 15 in which is removably mounted a drill bit 21. Support structure 12 moves horizontally in X and Y over the surface of work table 10 to position the drill bit at a desired location with respect to a workpiece 22. The drill bit is then rotated, and the spindle lowers the rotating bit to drill a hole in the workpiece.

In accordance with principles of the present invention, a drill bit end position sensor 30 is fixedly mounted on the work table in a known Z axis position. To utilize the bit end position sensor 30 the support structure is moved to cause the drill bit to be positioned over a drill bit receiving hole 32 formed in the sensor 30, and the spindle is operated to rotate the drill bit at a predetermined rotational speed and to simultaneously lower the bit slowly into the sensing hole 32. Structure within the sensing hole 32, to be described in detail below, together with associated electrical circuitry, then measures the Z axis position of the tip of the drill bit in a fixed reference system. This Z axis position of the tip is then stored by the machine tool control, which can thereafter accurately control Z axis position of the bit as it drills a hole in the workpiece 22, thereby controlling hole depth.

The sensor 30 (FIGS. 2-5) includes a rigid depth sensing pad 36, having a circular aperture 38 in which is fixedly mounted a bushing 40. The upper end of the bushing is flush with an upper surface 42 of the pad 36, and the lower end of the bushing is provided with a pair of shallow diametrically opposed slots 44,46. A recess 48 in the pad 36 at one side of hole 38 mounts a conventional and inexpensive light emitting diode (LED) 50, and a recess 52 in the pad diametrically opposite the recess 48 mounts a light sensitive or photo transistor 54. The light emitting diode and photo transistors are held in place by a lower cap 60 that is fixed to the pad 36 and includes lateral flanges 62,64 which contact and support lower ends of the light emitting diode and photo transistor structures. Slots 44 and 46 together provide slots of very small dimensions that allow only a very narrow beam of light to be received by the photo transistor 54. The received beam of light in a typical embodiment has a height of approximately 0.003 inches, which is the vertical height of slots 44 and 46. The sensor establishes a known fixed elevation of slot 44 and, therefore, of the beam of light received by the photo transistor.

Figure 2:
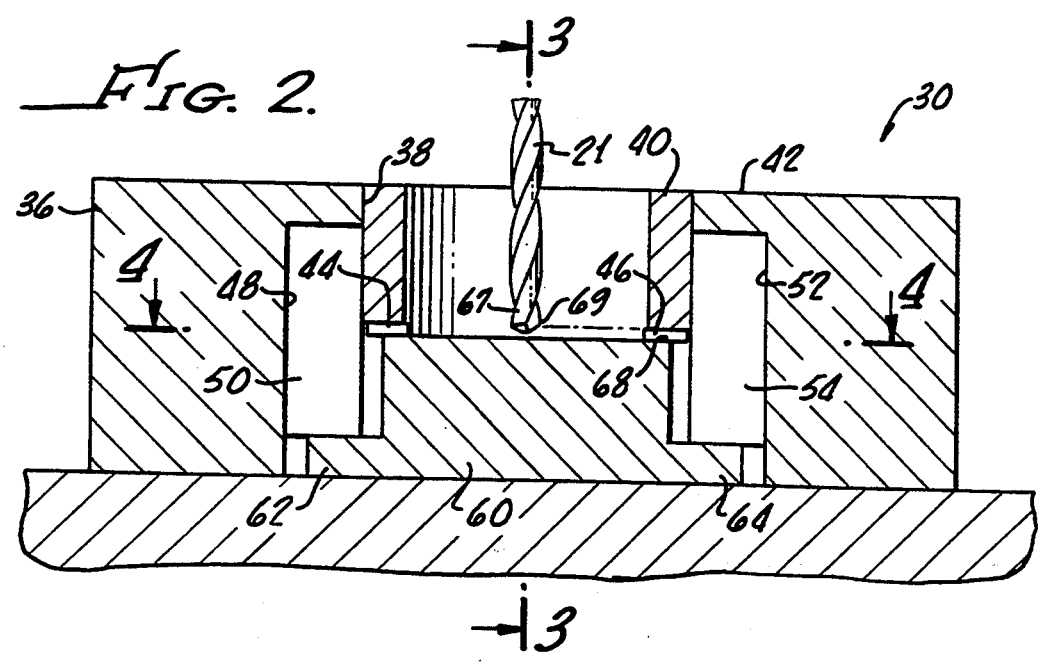
FIG. 2 is a sectional view of a drill bit sensing structure employed in an embodiment of the present invention.

Principles of the invention take advantage of the fluted construction of the common drill bit or drill point and utilize these flutes on a rotating bit to modulate the vertically narrow light beam received by the transistor 54. The tip of a typical drill bit is illustrated in FIGS. 2 and 3 and includes first and second tapered and angulated flute ends 67,69 to provide the bit end with different shapes when viewed at different angles. The drill bit is rotated at a fixed known speed and slowly lowered into the calibration hole of the bushing 40. When the tip of the drill bit begins to penetrate the light beam, the amount of light received by the photo transistor is slightly modulated by the two flutes of the rotating bit.

Reception of the modulated light beam by the photo transistor produces an electrical signal from the photo transistor that is modulated at a frequency that is a fixed multiple of the bit rotation speed. Typically the bit is rotated at 1,500 revolutions per second to provide an output electrical signal that fluctuates at 3,000 cycles per second.

Figure 6:
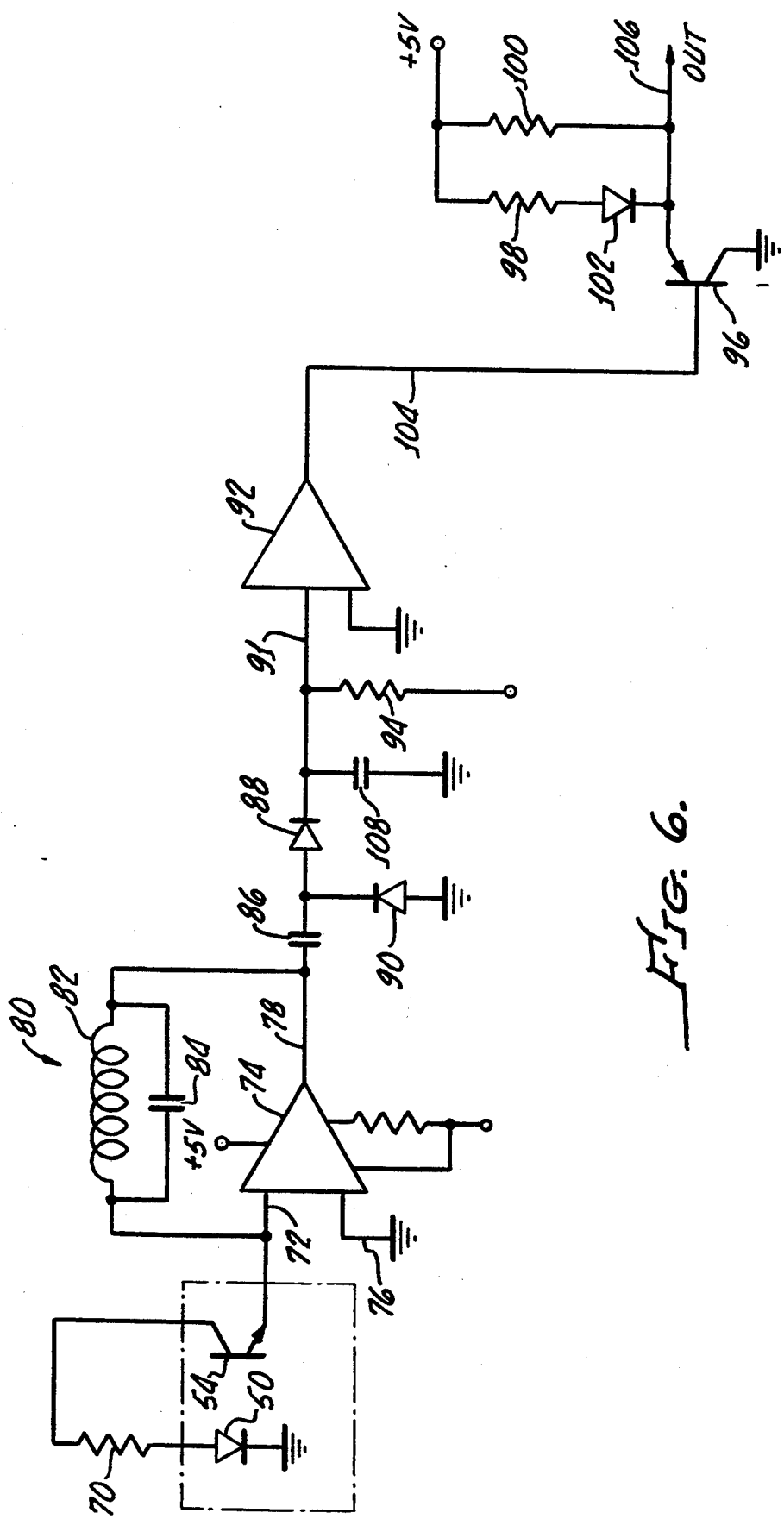
FIG. 6 is a circuit diagram of a drill bit detector and resonant circuit embodying principles of the present invention.

FIG. 6 illustrates circuitry of an arrangement for signalling time of the initial penetration of the drill bit into the light beam. Light emitting diode 50 may be an infrared diode that directs a light beam to a photo transistor 54. Current from a source of positive potential is fed through a current limiting resistor 70, through the light emitting diode 50 to ground. The positive potential is applied to the collector of light sensitive transistor 54, which has its emitter connected to an input terminal 72 of an operational amplifier 74, having its second input terminal 76 grounded. The amplifier has an output terminal 78 which is connected to its input terminal 72 by means of a negative feedback circuit 80. Feedback circuit 80 comprises a coil 82 and a capacitor 84 that are configured to have a resonant frequency that is a fixed multiple of the rotational speed of the rotating bit. In a presently preferred embodiment the resonant frequency of the circuit 82,84 is 3,000 hertz. Quiescent current from the output of amplifier 74 is fed back through the relatively low resistance (in the order of 600 ohms) of coil 82 to hold the voltage at input terminal 72 of the amplifier to nearly zero volts. At frequencies other than the resonant frequency (3,000 hertz in the illustrated example) the impedance of the parallel resonant LC circuit 80 is approximately the same as the very low resistance of the coil 82.

If the input signal at terminal 72 varies at a frequency other than the resonant frequency of circuit 80, the very low feedback resistance provides an output voltage at terminal 78 of substantially zero volts. When the spinning drill tip modulates the light at resonant frequency, the parallel resonant circuit 80 provides a very high impedance in the amplifier feedback circuit. Therefore, even the very small input current pulses produced by the spinning drill bit cause the output of amplifier 74 to provide a high AC output voltage. This voltage is coupled via a capacitor 86 and via a pair of voltage limiting diodes 88,90, to the input of an operational amplifier 92 that is connected to a negative voltage via a resistor 94. The output of amplifier 92 is connected to the base of a transistor 96, having its collector connected to a positive source of voltage through resistors 98,100 and a light emitting diode 102 that provides a visible output signal. An output from the collector of transistor 96 on a line 106 provides a signal that occurs at the time of the initial penetration of the drill bit end into the light beam, and thus an indication of the drill bit vertical position.

During quiescent condition resistor 94 reduces the voltage at the input to amplifier 92 to a value less than the grounded voltage at the second input to this amplifier. The voltage applied to amplifier 92 is limited by the sum of the forward voltage drops across diodes 88 and 90. Normally, during quiescent condition, the output of amplifier 92 on line 104 is high, which turns off transistor 96 and also turns off visible light emitting diode 102, whereby the output of the system on line 106 is high.

When a resonant signal occurs at the input of amplifier 74, its output goes high, and capacitor 86 and a second capacitor 108 connected between an input of amplifier 92 and ground, together with diodes 88 and 90, effectively form a voltage doubler that causes the input 91 of amplifier 92 to go high. The amplifier output on line 104 then goes low to turn on transistor 96, turn on the visible light emitting diode 102, and provide a low output signal on line 106. Occurrence of this output signal signals the machine controlling computer that the end of the drill bit is at the known height (Z axis position) of the light beam from LED 50 and subsequent Z axis motion of this drill bit is then all related to the known height of the light beam.

There has been shown and described a drill point position sensor having greatly increased sensitivity and accuracy but which employs simple and inexpensive components and does not subject the drill bit to possibly damaging contact forces.

I claim:

1. A method of sensing the end of a drill point comprising the steps of:
   rotating the drill point at a known speed,
   projecting a light beam along a path of known position,
   moving the rotating drill point to cause it to penetrate the light beam,
   modulating the light beam at a predetermined frequency that is an integral multiple of said known speed when the end of the drill point begins to penetrate the path of said light beam while the drill point is rotating,
   detecting the beginning of penetration of the light beam by the drill point by detecting when the light beam begins to be modulated at said predetermined frequency, and
   employing a circuit resonant at a frequency that is an integral multiple of said known speed to indicate time of the initial penetration of the drill point into the light beam to indicate position of said drill point relative to said known position.

2. The method of claim 1 wherein said step of detecting the beginning of penetration comprises generating from said modulated light beam an electrical signal that varies at a sensing frequency having a known relation to said known speed, and applying said electrical signal to said circuit that is resonant at a frequency that is an integral multiple of said known speed.

3. The method of claim 1 wherein said steps of detecting the beginning of penetration and employing a circuit comprise generating an electrical signal that begins to be modulated when said light beam begins to be modulated, applying said electrical signal to the input of an amplifier having a feedback circuit that is resonant at a frequency that is an integral multiple of said known speed and detecting output of said amplifier.

4. The method of claim 1 wherein said steps of detecting the beginning of penetration and employing a circuit comprise generating an electrical signal that begins to be modulated when said light beam begins to be modulated, applying said electrical signal to an amplifier having an output, and causing said resonant circuit to be responsive to the beginning of modulation of said electrical signal for effecting a large change in said amplifier output at the time of the initial penetration of the drill point into said light beam.

5. A drill bit position sensor comprising:
   source means for projecting an unmodulated light beam along an optical path of known position,
   light sensitive means positioned to receive light from said source means and spaced from said source means to define a detection space between the source means and the light sensitive means, said light sensitive means including means for generating an unmodulated electrical signal in response to light received from said source means, said detection space being configured and arranged to receive an end of a rotating drill bit that is movable to penetrate said optical path, said light beam and said electrical signal being modulated with a modulation that begins at the time of the initial penetration of said drill bit end into said optical path,
   a circuit that is resonant at a frequency that is a fixed multiple of the speed of rotation of said rotating drill bit, and
   means for applying said electrical signal from said light sensitive means to said circuit to cause the circuit to signal time of initial penetration of the drill bit into said optical path.

6. The drill bit position sensor of claim 5 wherein said source means comprises a light emitting diode and wherein said circuit comprises an amplifier having output and input terminals, a resonant circuit connected between said output and input terminals, means for applying said electrical signal to said input terminal, and signalling means connected to said output terminal.

7. A drill bit position sensor comprising:
   a sensor body having a bore,
   first and second diametrically opposed apertures formed in said bore,
   a light emitting diode mounted in said body and configured and arranged to project an unmodulated light beam across said bore from said first aperture to said second aperture,
   a photosensitive device in said body adjacent said second aperture positioned to receive light transmitted from said light emitting diode,
   an operational amplifier having a first input terminal connected to said photosensitive device and having an output terminal,
   a resonant circuit connected between said input and output terminals, and having a predetermined resonant frequency that is a fixed multiple of a predetermined rotational speed of a drill bit that is to be inserted into said bore to penetrate said light beam and of which the position of a tip is to be measured, and
   output means connected to said amplifier output terminal for signalling time of initial penetration of a drill bit into said light beam.

8. The sensor of claim 7 wherein said second aperture has a very small dimension in the direction of the axis of said bore.

9. A method of detecting longitudinal position of the end of a drill bit comprising the steps of:
   rotating the drill bit at a known speed,
   projecting an unmodulated light beam along a path of known position,
   moving the drill bit, as it rotates, toward said light beam to cause the drill bit end to begin to penetrate said light beam, said light beam having a modulation that begins at the time of said initial penetration of the drill bit and into said light beam, said modulation having a frequency that is an integral multiple of said known speed,
   detecting said projected light beam,
   generating an electrical signal in response to said detected light beam, said electrical signal having a modulation that begins at said time of initial penetration of the drill bit end into said light beam, said electrical signal modulation having a frequency that is an integral multiple of said known speed, and
   employing a circuit that is resonant at a frequency that is an integral multiple of said known speed to signal the time of said initial penetration of drill bit end into said light beam.

* * * * *